(12) United States Patent
Cargill (10) Patent No.: US 7,651,100 B2
(45) Date of Patent: *Jan. 26, 2010

(54) SEAL ASSEMBLY FOR LIMITING MOVEMENT OF A SEAL WITHIN A SEAL HOUSING

(75) Inventor: Edward James Cargill, Devon (CA)

(73) Assignee: Halliburton Energy Services, Inc., Houston, TX (US)

( * ) Notice: Subject to any disclaimer, the term of this patent is extended or adjusted under 35 U.S.C. 154(b) by 973 days.

This patent is subject to a terminal disclaimer.

(21) Appl. No.: 10/769,761

(22) Filed: Feb. 3, 2004

(65) Prior Publication Data

US 2004/0155411 A1    Aug. 12, 2004

Related U.S. Application Data

(63) Continuation of application No. 09/595,879, filed on Jun. 20, 2000, now Pat. No. 6,712,366.

(30) Foreign Application Priority Data

May 2, 2000    (CA) .................................... 2307433

(51) Int. Cl.
*F16J 15/34*    (2006.01)
*F16J 15/02*    (2006.01)

(52) U.S. Cl. ................. 277/372; 277/379; 277/573; 277/584; 277/641

(58) Field of Classification Search ............... 277/641, 277/372, 445, 573, 616, 576, 379, 553, 558, 277/584

See application file for complete search history.

(56) References Cited

U.S. PATENT DOCUMENTS 1,168,002 A    1/1916    Hirth

| 1,715,854 | A | * | 6/1929 | Mckenzie-Martyn ........ 285/331 |
| 1,781,207 | A | | 11/1930 | Wysong |
| 1,999,094 | A | | 4/1935 | Gordon |
| 2,426,047 | A | | 8/1947 | Payne |
| 2,462,596 | A | | 2/1949 | Bent |

(Continued)

FOREIGN PATENT DOCUMENTS

GB    2172324    9/1986

(Continued)

*Primary Examiner*—Alison K Pickard
(74) *Attorney, Agent, or Firm*—Terrence N. Kuharchuk; William E. Shull; Malcolm E. Whittaker (57) ABSTRACT

An improvement in a seal assembly for sealing with a rotatable component extending within the seal assembly and defining a longitudinal axis of rotation, the seal assembly being of a type including a seal element retained by a seal housing, where one of the seal element and the seal housing is constructed from a compressible material, where the seal element includes a seal engagement surface and where the seal housing includes a housing engagement surface. The improvement includes one of the seal engagement surface and the housing engagement surface being comprised of the compressible material and the other being oriented in a plane normal to the longitudinal axis of rotation of the component extending within the seal assembly and defining a depression for providing an isolated gap between the seal engagement surface and the housing engagement surface for receiving the compressible material to restrain movement of the seal element relative to the seal housing.

14 Claims, 2 Drawing Sheets

U.S. PATENT DOCUMENTS

| | | | |
|---|---|---|---|
| 2,487,669 A | 11/1949 | Pattullo et al. | |
| 2,690,360 A | 9/1954 | Young | |
| 2,722,439 A * | 11/1955 | Brummer et al. | 277/373 |
| 2,890,901 A * | 6/1959 | Martin | 277/391 |
| 3,117,796 A | 1/1964 | Liebig | |
| 3,123,367 A | 3/1964 | Brummer et al. | |
| 3,173,698 A | 3/1965 | Haberkorn | |
| 3,214,182 A | 10/1965 | Herbruggen | |
| 3,359,999 A * | 12/1967 | Mueller | 137/246.15 |
| 3,403,717 A * | 10/1968 | Lemelson | 411/143 |
| 3,501,156 A | 3/1970 | Rose | |
| 3,716,245 A * | 2/1973 | Turolla | 277/584 |
| 3,830,508 A | 8/1974 | Endicott | |
| 3,843,139 A | 10/1974 | Messenger | |
| 4,082,296 A | 4/1978 | Stein | |
| 4,165,622 A | 8/1979 | Brown, Jr. | |
| 4,165,882 A * | 8/1979 | Crow | 277/345 |
| 4,210,405 A * | 7/1980 | Jesswein | 403/158 |
| 4,335,887 A | 6/1982 | Benassi | |
| 4,357,026 A | 11/1982 | Panchetti | |
| 4,426,090 A * | 1/1984 | Bender | 277/582 |
| 4,504,069 A | 3/1985 | Stenlund | |
| 4,610,319 A * | 9/1986 | Kalsi | 175/371 |
| 4,703,937 A * | 11/1987 | Chrzanowski | 277/584 |
| 4,729,569 A * | 3/1988 | Muller et al. | 277/584 |
| 4,842,287 A * | 6/1989 | Weeks | 277/641 |
| 5,088,745 A | 2/1992 | Peppiatt et al. | |
| 5,116,066 A | 5/1992 | Crawford | |
| 5,140,904 A | 8/1992 | Schonlau | |
| 5,263,404 A * | 11/1993 | Gaucher et al. | 92/168 |
| 5,368,314 A | 11/1994 | Victor et al. | |
| 5,403,019 A | 4/1995 | Marshall | |
| 5,603,510 A | 2/1997 | Sanders | |
| 5,642,889 A | 7/1997 | Pauler et al. | |
| 5,875,859 A | 3/1999 | Ikeda et al. | |
| 5,952,080 A | 9/1999 | Etsion et al. | |
| 6,036,192 A * | 3/2000 | Dietle et al. | 277/559 |
| 6,139,020 A | 10/2000 | Friend et al. | |
| 6,155,573 A | 12/2000 | Simms | |
| 6,189,896 B1 | 2/2001 | Dickey et al. | |
| 6,334,619 B1 * | 1/2002 | Dietle et al. | 277/559 |
| 6,382,634 B1 * | 5/2002 | Dietle et al. | 277/560 |
| 6,712,366 B1 * | 3/2004 | Cargill | 277/641 |

FOREIGN PATENT DOCUMENTS

GB    2172325    9/1986

* cited by examiner

SEAL ASSEMBLY FOR LIMITING MOVEMENT OF A SEAL WITHIN A SEAL HOUSING

TECHNICAL FIELD

A seal assembly for limiting the amount of movement or distortion experienced by a seal element which is retained by a seal housing.

BACKGROUND OF THE INVENTION

In a typical seal assembly a seal element is retained by a seal housing. The seal element provides a sealing surface which in service may be exposed to a variety of forces acting on the seal which tend to move or distort the seal element. This movement or distortion may result in the seal failing to perform as intended either by permitting leakage across the seal or by allowing abrasive media to become embedded in the sealing surface, thus causing premature wearing of the seal element.

The forces acting on the seal may be caused by a pressure differential across the seal element, in which case the sealing surface will tend to move or distort laterally within the seal housing either so that the, sealing force exerted by the sealing surface against its abutting component is reduced or so that the seal element is "lifted" out of the seal housing by fluid which passes under pressure between the seal element and the seal housing. These effects becomes more problematic where there is a high constant or transient differential pressure across the seal.

It may be possible to counteract these effects by using springs or other biasing devices to provide additional sealing force to keep the sealing surface engaged with both the abutting component and with the seal housing. Unfortunately, however, the necessary spring force increases with the pressures exerted on both sides of the seal and with the differential pressure across the seal. If the spring force is too high the amount of deformation and compression of the seal element caused by the spring force may itself result in the seal element failing to perform as intended.

Where the seal is a dynamic seal, the forces may also result from movement of components associated with the seal or from relative movement between the sealing surface and components abutting the sealing surface. If the dynamic seal provides a seal between components that move axially relative to each other then the seal element may tend to move axially due to friction in the same direction as the component that abuts the sealing surface. If the dynamic seal provides a seal between components that rotate relative to each other then the seal element may tend to rotate due to friction in the same direction as the component that abuts the sealing surface.

Regardless of whether the movement or distortion of the seal element is caused by differential pressure or relative movement of components, it may be controlled by providing one or more engagement forces between the seal element and the seal housing during service which restrain the seal element against movement in the seal housing.

The engagement force or forces between the seal element and the seal housing during service may be achieved by permanently fixing the seal element in the seal housing by gluing or otherwise connecting the seal element with the seal housing. Unfortunately this option may result in higher fabrication costs by complicating the design of the seal and may also increase the difficulty of replacing seal elements as they become worn.

There is therefore a need for a seal assembly in which movement or distortion of the seal element can be limited by providing one or more engagement forces between the seal element and the seal housing during service without permanently fixing the seal element in the seal housing and without relying exclusively on springs or other external mechanisms for supplying an effective engagement force.

SUMMARY OF THE INVENTION

The present invention is an improvement in a seal assembly of the type comprising a seal element and a seal housing, which seal assembly is useful for limiting the movement of the seal element in the seal housing. The improved seal assembly limits movement of the seal element in the seal housing by providing one or more engagement forces between the seal element and the seal housing during service without having to permanently fix the seal element in the seal housing.

The seal assembly derives the engagement force between the seal element and the seal housing from pressure which may exerted on the seal element during service, which engagement force in turn results in a frictional force which serves to restrain the seal element from movement in the seal housing. The engagement force is provided by reducing the extent to which pressurized fluid is allowed to be present throughout the interfaces between the seal element and the seal housing.

The presence of pressurized fluid throughout the interfaces between the seal element and the seal housing is reduced by providing that one of the seal element and the seal housing is comprised of a compressible material and by providing one or more gaps between a seal engagement surface on the seal element and a housing engagement surface on the seal housing.

This gap provides an isolated space into which the compressible material of the seal element or seal housing may be pressed under the influence of pressure acting on the seal element in order to provide the engagement force between the seal element and the seal housing. An advantage of the invention is that the magnitude of the engagement force increases as the pressure acting on the seal element increases.

In a preferred aspect, the invention is an improvement in a seal assembly comprising a seal element retained by a seal housing, wherein one of the seal element and the seal housing is comprised of a compressible material, wherein the seal element is comprised of a seal engagement surface, and wherein the seal housing is comprised of a housing engagement surface for engaging the seal engagement surface, the improvement comprising at least one of the seal engagement surface and the housing engagement surface defining a depression for providing an isolated gap between the seal engagement surface and the housing engagement surface.

Either of the seal element or the seal housing may be comprised of a compressible material. For example, the seal assembly may be comprised of a compressible seal element retained by a rigid seal housing or the seal assembly may be comprised of a rigid seal element retained by a compressible seal housing. In the preferred embodiment the seal assembly is comprised of a compressible seal element retained by a rigid seal housing.

The compressible material may be comprised of a non-resilient compressible material which does not return to its original shape when pressure is removed from it, although the use of non-resilient compressible materials may necessitate replacement of the compressible seal element or the compressible housing element, as the case may be, each time the seal assembly is exposed to a cycle of pressurization and depressurization. Preferably the compressible material is therefore comprised of a resilient compressible material which can be reused following decompression.

The depression may be defined by the seal engagement surface, the housing engagement surface, or by both the seal engagement surface and the housing engagement surface. Preferably the depression is not defined by a surface which is comprised of a compressible material in order to limit any distorting effect on the depression which may be caused by pressure between the seal engagement surface and the housing engagement surface. In the preferred embodiment where the seal element is comprised of a compressible material the depression is preferably defined by the housing engagement surface.

The seal assembly may be a static seal assembly or a dynamic seal assembly. In the preferred embodiment the seal assembly is a dynamic seal assembly in which a component such as a rotating shaft abuts a sealing surface of the seal element.

Each of the seal element and the seal housing may be comprised of one or more engagement surfaces. Typically the seal assembly will provide for a plurality of seal engagement surfaces which engage a plurality of housing engagement surfaces in order that the seal element is retained by the seal housing. Some or all of the pairs of engagement surfaces may be oriented in different planes. Depressions may be associated with one or more of these pairs of engagement surfaces to provide for one or more engagement forces, which engagement forces may thus be exerted in one or more directions. The engagement surfaces may be circumferential surfaces which surround the component which abuts the sealing surface of the sealing element.

In the preferred embodiment, the seal element and the seal housing are each comprised of a plurality of engagement surfaces but a depression is defined in only one pair of engagement surfaces. In the preferred embodiment the depression is defined by a housing engagement surface which is oriented in a plane normal to the longitudinal axis of the shaft which rotates within the seal assembly. In the preferred embodiment the seal engagement surface and the housing engagement surface are circumferential surfaces which surround a rotatable shaft which abuts the sealing surface of the sealing element.

The depression may be comprised of any shape or configuration which is capable of providing an isolated gap between the seal engagement surface and the housing engagement surface. An isolated gap is necessary in order to inhibit the passage of pressurized fluid into the gap which may offset or neutralize the engagement force otherwise exerted between the seal engagement surface and the housing engagement surface.

The depression may be comprised of a single isolated depression or may be comprised of a depression pattern. Preferably the depression is comprised of a depression pattern. Preferably the depression pattern is distributed throughout a substantial portion of the seal engagement surface or the housing engagement surface so that the engagement force is likewise distributed.

The depression pattern may be comprised of one or more grooves. In the preferred embodiment where the seal engagement surface and the housing engagement surface are comprised of circumferential surfaces the depression pattern may be comprised of a single uninterrupted groove (such as a semi-circular, circular or spiral groove) or may be comprised of a plurality of unconnected grooves which extend along the seal engagement surface or the housing engagement surface, as the case may be. Preferably the groove or grooves extend in a direction perpendicular to the longitudinal axis of the rotating shaft but they could also extend in a direction parallel to the longitudinal axis of the rotating shaft.

In the preferred embodiment the depression pattern is comprised of a plurality of unconnected substantially parallel grooves which extend circumferentially around the housing engagement surface concentrically in a direction perpendicular to the longitudinal axis of the rotating shaft.

The depression pattern may also be comprised of a plurality of dimples in the housing engagement surface. The dimples may be of any shape, size or configuration as long as they provide the necessary depression and thus gap in the seal engagement surface or the housing engagement surface, as the case may be.

The depression or depression pattern forms a depression profile in the seal engagement surface or the housing engagement surface, as the case may be. The depression profile may comprise any shape. For example, the depression profile may be a bevelled surface, a rounded surface or may be a truncated bevelled or rounded surface.

The seal assembly preferably includes a preloading mechanism for applying a preloading force to urge the seal engagement surface and the housing engagement surface into engagement with each other. The purpose of this preloading force is to provide an initial engagement force between the seal engagement surface and the housing engagement surface to inhibit the passage of fluid between the engagement surfaces in order to enable the engagement force to develop in the depression as the pressure applied to the seal element increases while the seal assembly is in service.

The preloading mechanism may be comprised of any apparatus or device that is capable of applying the preloading force. In the preferred embodiment the preloading mechanism is comprised of one or more springs which are retained by the seal housing and which apply the preloading force to the seal element to urge the seal engagement surface against the housing engagement surface.

BRIEF DESCRIPTION OF DRAWINGS

Embodiments of the invention will now be described with reference to the accompanying drawings, in which.

DETAILED DESCRIPTION

Figure 1:
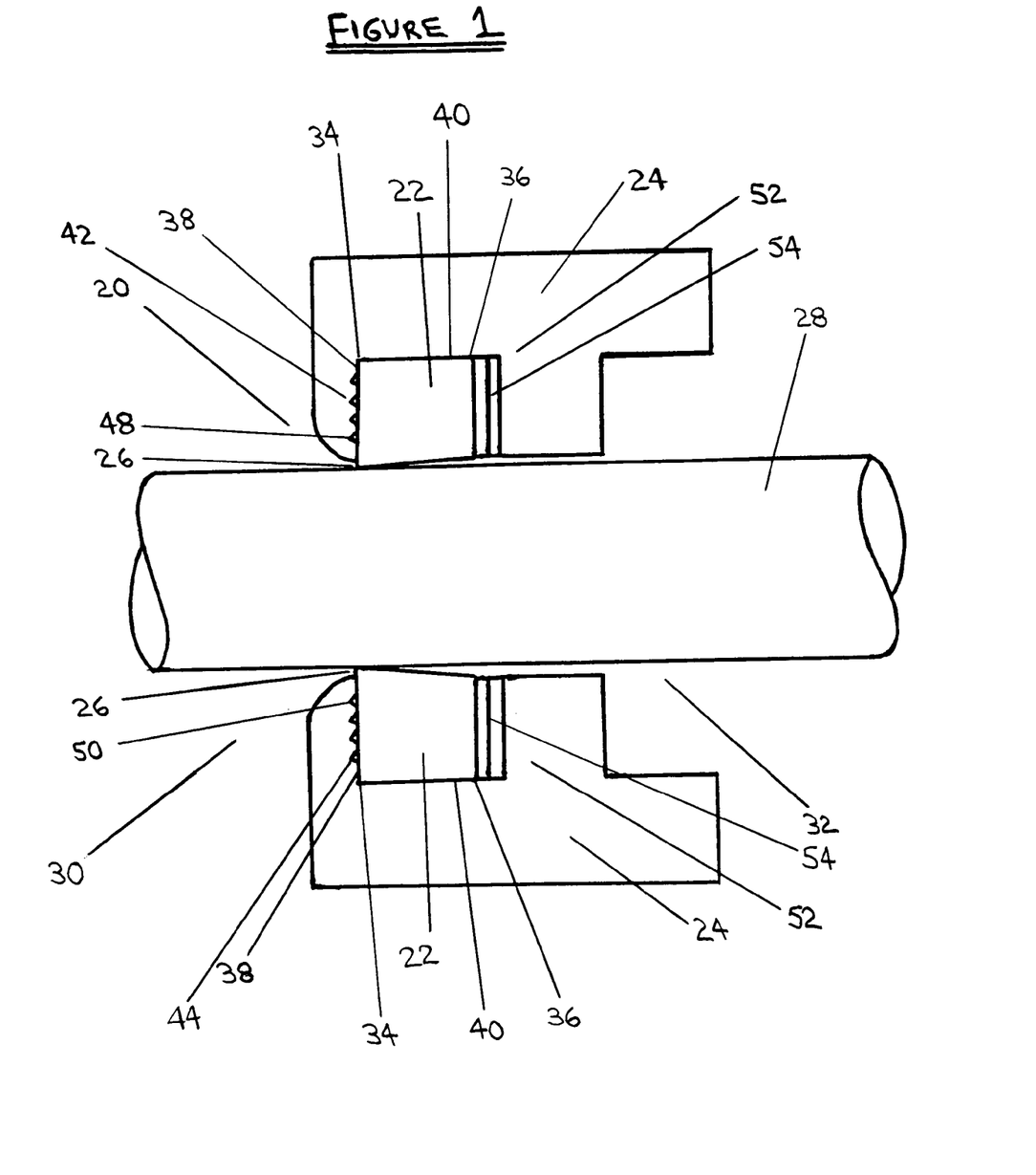
FIG. 1 is a cross-sectional assembly drawing of a seal assembly including a preferred embodiment of the improvement of the invention.

Referring to FIG. 1, there is depicted a seal assembly (20). The seal assembly (20) includes a seal element (22) and a seal housing (24).

In the preferred embodiment the seal assembly (20) is a dynamic seal which seals between a sealing surface (26) on the seal element (22) and a rotatable shaft (28) which passes through the seal assembly (20). The seal assembly (20) may, however, be a dynamic seal which seals between the sealing surface (26) and a component which moves longitudinally relative to the seal element (22). The seal assembly (20) may also be a static seal which seals between the sealing surface (26) and a component that does not move relative to the sealing element (22). The seal assembly (20) may therefore be used in a wide range of applications requiring either static or dynamic seals.

In the preferred embodiment the seal assembly (20) is incorporated into an apparatus (not shown) which supports and contains the rotatable shaft (28). The function of the seal assembly (20) is to isolate fluids on a first side (30) of the seal assembly (20) from fluids on a second side (32) of the seal assembly (20). For example, in the preferred embodiment the seal assembly (20) may isolate abrasive fluids on the first side (30) of the seal assembly (20) from lubricating fluids on the second side (32) of the seal assembly (20).

One application of the seal assembly (20) of the preferred embodiment is in conjunction with a drilling apparatus for drilling subterranean boreholes. In particular, the seal assembly (20) may be used in a steerable rotary drilling apparatus, in which case the rotatable shaft (28) may be a rotatable drilling shaft and the seal housing (24) may be associated with a stationary housing (not shown).

Examples of steerable rotary drilling apparatus in which the seal assembly (20) may be used include the apparatus described in UK Patent No. 2,172,324 (Douglas et al) in which a dynamic rotary seal is designated by reference number 34, the apparatus described in UK Patent No. 2,172,325 (Douglas et al) in which a dynamic rotary seal is designated by reference number 156, and U.S. Pat. No. 5,875,859 (Ikeda et al) in which dynamic rotary seals are designated by reference numbers 7 and 16.

In each of these exemplary steerable rotary drilling apparatus a steering mechanism is contained within the stationary housing and the function of the rotary seals is to isolate the steering mechanism from abrasive borehole fluids. The dynamic seals in these exemplary apparatus may be exposed to harsh conditions in service, including relatively high absolute pressures and relatively high static and transient pressure differentials across the dynamic seals, with the result that the seal assembly (20) may be particularly useful in such apparatus.

In the preferred embodiment the seal element (22) is comprised of a resilient compressible material and the seal housing (24) is comprised of a rigid material. This configuration could, however, be reversed so that a rigid seal element (22) is retained by a compressible seal housing (24).

The seal element (22) includes seal engagement surfaces (34,36) and the seal housing (24) includes corresponding housing engagement surfaces (38,40).

Either or both of the housing engagement surfaces (38,40) may define a depression. Similarly, either or both of the seal engagement surfaces (34,36) may define a depression either as a complement to depressions defined by the housing engagement surfaces (38,40) or independent thereof. In the preferred embodiment housing engagement surface (38) defines a depression (42) but housing engagement surface (40) and seal engagement surfaces (34,36) do not define depressions.

The depression (42) may be comprised of any shape, size, configuration or profile and may include one or more discrete depressions. Preferably the depression (42) is comprised of a depression pattern which may include one or more discrete depressions in the housing engagement surface (38).

For example, the depression pattern may include a single groove in the housing engagement surface which may be oriented in any direction, such as circumferentially or parallel to the rotatable shaft (28). A single circumferential groove may extend for a length shorter than, equal to, or longer than the circumference of the housing engagement surface, in which latter case it may be a spiral continuous groove.

Figure 2:
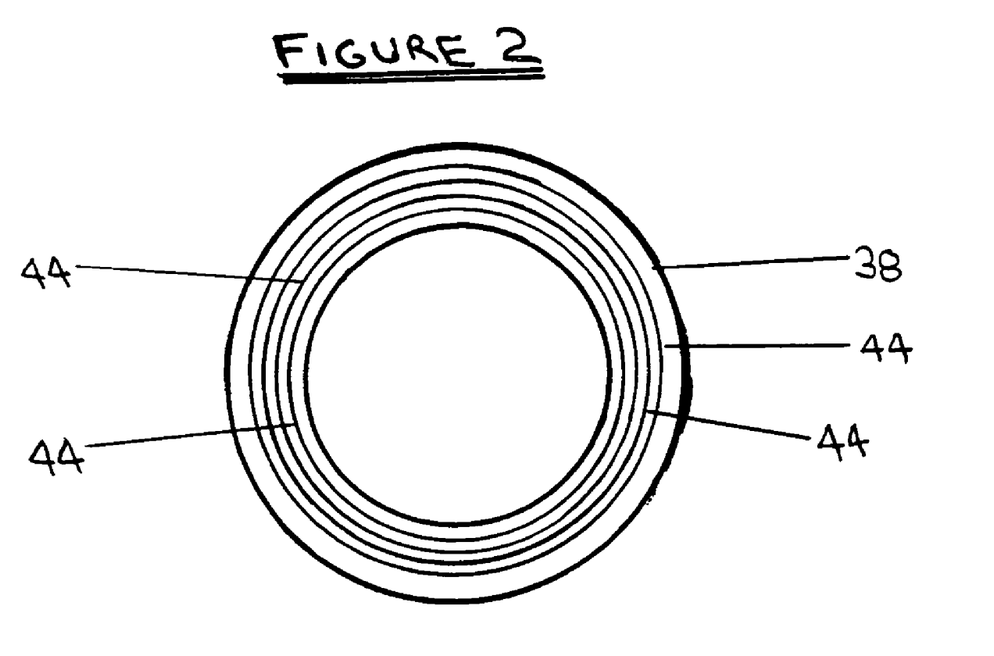
FIG. 2 is a plan view of a housing engagement surface according to the improved seal assembly of FIG. 1 in which the depression is comprised of a depression pattern consisting of four substantially parallel and concentric circumferential grooves.
Figure 3:
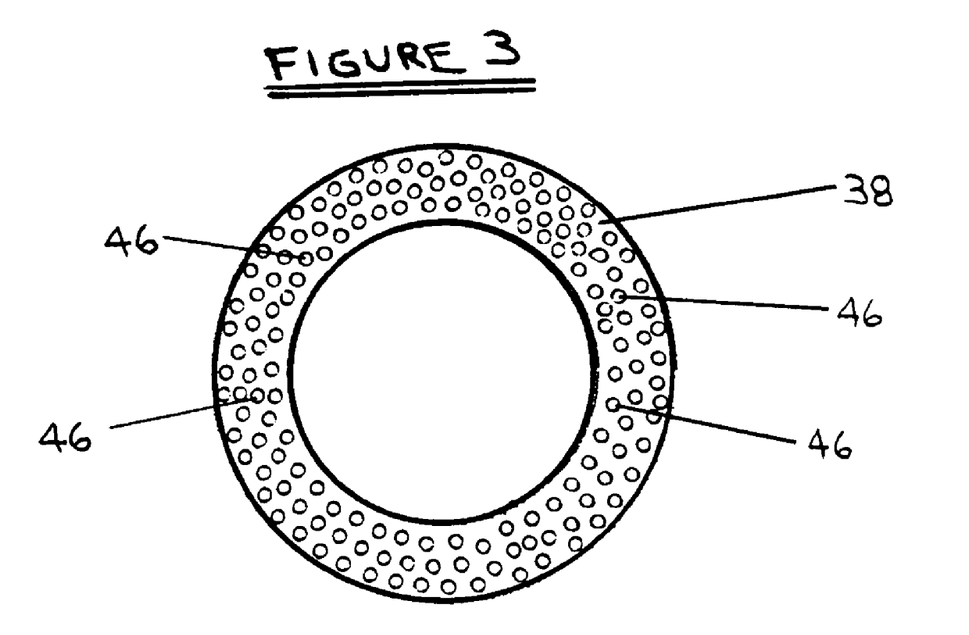
FIG. 3 is a plan view of a housing engagement surface according to the improved seal assembly of FIG. 1 in which the depression is comprised of a depression pattern consisting of a plurality of dimples distributed throughout a substantial portion of the housing engagement surface.

Referring to FIGS. 1 and 2, in the preferred embodiment the depression (42) is comprised of a depression pattern which includes four discrete substantially parallel and concentric circumferential grooves (44). Alternatively, referring to FIG. 3, the depression may be comprised of a depression pattern which includes a plurality of discrete dimples (46).

The depression (42) provides an isolated gap (48) between the housing engagement surface (38) and the seal engagement surface (34). In the preferred embodiment the isolated gap (48) is comprised of four discrete gaps corresponding to the four circumferential grooves (44). The depression (42) also defines a depression profile (50).

The gap (48) is isolated in that the seal engagement surface (34) effectively seals the gap (48) on all sides to trap low (atmospheric) pressure air in the gap while the seal assembly (20) is being assembled and to inhibit fluid from passing into the gap (48) while the seal is in service.

The combination of the compressible seal element (22) and the gap (48) thus permits a differential pressure between a pressure applied to the seal element (22) in service and the atmospheric pressure inside the gap (48) to be transferred to the depression profile (50) as the seal element deforms and is pressed into the gap (48).

This differential pressure in turn provides an engagement force between the seal engagement surface (34) and the housing engagement surface (38) in the vicinity of the depression profile (50), which engagement force is approximately equal to the differential pressure multiplied by the area of the depression profile (50). The engagement force results in a frictional force between the seal element (22) and the seal housing (24) which acts to retain the seal element (22) in position relative to the seal housing (24).

The engagement force in the depression profile (50) increases as the pressure applied to the seal element (22) increases. As a result, one of the advantages of the invention is that the engagement force in the depression profile (50) may increase at the same time that other forces acting on the seal element (22) increase, thus providing additional resistance to movement of the seal element (22) as service conditions become more demanding.

The configuration of the depression (42) may be varied to achieve numerous objectives.

First, the depression (42) may be distributed throughout a substantial portion of the housing engagement surface (38). Such a configuration may be used to maximize the area of the depression profile (50) and thus the engagement force provided by pressurization of the seal element (22) and may also be used to distribute the engagement force throughout the housing engagement surface (38).

Second, the location, shape and orientation of the depression (42) and of discrete depressions may be designed to achieve particular results. For example, although locating the depression (42) in the housing engagement surface (38) may be most effective to counteract forces tending to cause lateral movement of the seal element (22), locating the depression (42) in the housing engagement surface (40) may be most effective to counteract forces tending to rotate the seal element (22) in the seal housing (24). This consideration may result in a design decision to provide depressions in one or the other or both of the housing engagement surfaces (38,40) and seal engagement surfaces (34,36).

As a second example, the orientation of the depression (42) may be designed so that the engagement force caused by pressurization of the seal element (22) provides shear resistance as well as frictional resistance to movement of the seal element (22). In this regard, the grooves (44) depicted in FIG. 2 will provide shear and frictional resistance against lateral movement of the seal element (22) in the seal assembly (20) of FIG. 1 but only frictional resistance against rotation of the seal element, while the dimples (46) depicted in FIG. 3 will provide shear and frictional resistance against both lateral movement and rotation of the seal element (22) in the seal assembly (20) of FIG. 1. This consideration may result in a design decision to utilize different shapes and configurations of depression (42) to counteract different types of forces which may act on the seal element (22).

As a third example, the grooves (44) as depicted in FIG. 2 may conceivably contribute a separate sealing function to the seal assembly (20) to prevent the passage of pressurized fluid between the seal engagement surface (34) and the housing engagement surface (38). In this regard, each groove (44) may function similar to an O-ring, thus effectively providing a "seal within a seal" to further enhance the reliability of the seal assembly (20).

In summary, the depression (42) may be located, oriented, shaped and configured in many ways in order to take advantage of the invention.

In the preferred embodiment the seal assembly (20) includes a preloading mechanism (52) for urging the seal engagement surface (34) and the housing engagement surface (38) into engagement with each other. The need and ability to provide for the preloading mechanism (52) in the seal assembly (20) depends upon the configuration of the seal element (22) and the seal housing (24). For example, it may be difficult to provide a preloading mechanism (52) in the seal assembly (20) for the purpose of urging the seal engagement surface (36) into engagement with the housing engagement surface (40).

The function of the preloading mechanism (52) is to provide an initial engagement force between the seal engagement surface (34) and the housing engagement surface (38) other than in the vicinity of the depression profile (50). This initial engagement force inhibits the passage of fluid between the engagement surfaces (34,38) in order to enhance the isolation of the depression (42) and permit the engagement force in the vicinity of the depression profile (50) to develop as the pressure applied to the seal element (22) increases while the seal assembly (20) is in service.

In the preferred embodiment the preloading mechanism is comprised of a spring or springs (54) which are positioned adjacent to the seal element (22) and are retained by the seal housing (24) in a similar manner to the seal element (22). These springs (54) act on the seal element (22) to urge the seal engagement surface (22) against the housing engagement surface (38).

The depression (42) may be formed in any manner. For example, in the preferred embodiment the depression may be stamped, cast, milled, cut, grinded or drilled into the housing engagement surface (34). In this regard, one consideration in selecting the shape, size, profile, configuration and orientation of the depression (42) is the simplification of fabrication methods and minimization of cost of the seal assembly (20). It may therefore be more cost effective to provide a depression (42) consisting of grooves than a depression (42) consisting of dimples.

The seal assembly (20) is prepared for use by assembling the seal element (22), the seal housing (24) and the preloading mechanism (52) within the apparatus (not shown) in which the seal assembly (20) is being used. The seal engagement surface (34) is thus pressed against the housing engagement surface (38) with a sufficient initial engagement force to seal the depression (42) and trap low (atmospheric) pressure air in the gap (48).

In the preferred embodiment where the apparatus is a steerable rotary drilling apparatus, the apparatus may then be lowered into a borehole (not shown) for the commencement of drilling operations.

As drilling operations progress through rotation of the rotatable shaft (28), the first side (30) of the seal assembly (20) is exposed to increasing borehole pressure as the borehole becomes deeper and is filled with drilling fluid. The borehole pressure may also fluctuate in response to drilling conditions which result in increasing or decreasing pump pressure and varying pressure drops through the drilling apparatus. The borehole pressure and fluctuations thereof may also be transmitted to the second side (32) of the seal assembly (20) if the apparatus provides for pressure balancing.

The increasing and fluctuating borehole pressure results in increased constant and transient pressure differentials between the first side (30) and the second side (32) of the seal assembly (20). The combined effects of increased borehole pressure, pressure differential across the seal assembly (20), and rotation of the rotatable shaft (28) in turn result in forces being applied to the seal element (22) which tend to move or distort the seal element (22).

At the same time the increasing pressure applied to the seal element (22) causes the seal element (22) to be pushed into the depression profile (50) as a result of the pressure differential between the borehole pressure and the atmospheric pressure in the gap (48).

The seal element (22) therefore exerts an engagement force against the depression profile (50), which engagement force results in a frictional force and perhaps a shear resistance which counteracts the forces tending to move or distort the seal element (22) in order to maintain the seal element (22) in position relative to the seal housing (24). The pressing of the seal element (22) into the gap (48) may also result in the seal element providing a secondary seal between the seal engagement surface (34) and the housing engagement surface (38) which inhibits the passage of borehole fluids between the seal engagement surface (34) and the housing engagement surface (38).

When drilling operations are terminated, the drilling apparatus may be removed from the borehole and prepared for future drilling operations. If the seal element (22) is comprised of a resilient compressible material then it may possibly be reused since the seal element (22) should return to its original shape upon removal of pressure from the seal assembly (20). If the seal element (22) is comprised of a non-resilient compressible material, it may remain pressed into the gap (48) despite removal of pressure from the seal assembly (20) and may therefore require replacement before the drilling apparatus is used again.

The embodiments of the invention in which an exclusive property or privilege is claimed are defined as follows:

1. In a seal assembly for sealing with a rotatable component so that the seal assembly defines a first side of the seal assembly and a second side of the seal assembly and so that the first side is sealed from the second side by the seal assembly, the component defining a longitudinal axis of rotation and the component extending through the seal assembly between the first side and the second side of the seal assembly, the seal assembly comprising a seal element retained within a seal housing, wherein one of the seal element and the seal housing is comprised of a compressible material, wherein the seal element is comprised of a planar seal engagement surface, and wherein the seal housing is comprised of a planar housing engagement surface for engaging the planar seal engagement surface, the improvement comprising:

(a) one of the planar seal engagement surface and the planar housing engagement surface being comprised of the compressible material;

(b) the other of the planar seal engagement surface and the planar housing engagement surface being oriented in a plane normal to the longitudinal axis of rotation of the component and defining a depression therein for providing an isolated gap between the planar seal engagement surface and the planar housing engagement surface when the planar seal engagement surface and the planar housing engagement surface are engaged, for receiving the compressible material, and wherein the depression is comprised of a plurality of substantially parallel circumferential grooves; and (c) the seal element being exposed to a fluid pressure on the second side of the seal assembly such that an engagement force is exerted between the planar seal engagement surface and the planar housing engagement surface in order to press the compressible material into the depression and thereby restrain movement of the seal element relative to the seal housing.

2. The improvement as claimed in claim 1, further comprising a preloading mechanism for urging the planar seal engagement surface and the planar housing engagement surface into engagement with each other.

3. The improvement as claimed in claim 2 wherein the preloading mechanism is comprised of at least one spring which is retained by the seal housing.

4. In a seal assembly for sealing with a rotatable component so that the seal assembly defines a first side of the seal assembly and a second side of the seal assembly and so that the first side is sealed from the second side by the seal assembly, the component defining a longitudinal axis of rotation and the component extending through the seal assembly between the first side and the second side of the seal assembly, the seal assembly comprising a seal element retained within a seal housing, wherein one of the seal element and the seal housing is comprised of a compressible material, wherein the seal element is comprised of a planar seal engagement surface, and wherein the seal housing is comprised of a planar housing engagement surface for engaging the planar seal engagement surface, the improvement comprising:

(a) one of the planar seal engagement surface and the planar housing engagement surface being comprised of the compressible material;

(b) the other of the planar seal engagement surface and the planar housing engagement surface being oriented in a plane normal to the longitudinal axis of rotation of the component and defining a depression therein for providing an isolated gap between the planar seal engagement surface and the planar housing engagement surface when the planar seal engagement surface and the planar housing engagement surface are engaged, for receiving the compressible material, and wherein the depression is comprised of a plurality of substantially parallel and concentric circumferential grooves; and (c) the seal element being exposed to a fluid pressure on the second side of the seal assembly such that an engagement force is exerted between the planar seal engagement surface and the planar housing engagement surface in order to press the compressible material into the depression and thereby restrain movement of the seal element relative to the seal housing.

5. In a seal assembly for sealing with a rotatable component so that the seal assembly defines a first side of the seal assembly and a second side of the seal assembly and so that the first side is sealed from the second side by the seal assembly, the component defining a longitudinal axis of rotation and the component extending through the seal assembly between the first side and the second side of the seal assembly, the seal assembly comprising a seal element retained within a seal housing, wherein one of the seal element and the seal housing is comprised of a compressible material, wherein the seal element is comprised of a planar seal engagement surface, and wherein the seal housing is comprised of a planar housing engagement surface for engaging the planar seal engagement surface, the improvement comprising:

(a) one of the planar seal engagement surface and the planar housing engagement surface being comprised of the compressible material;

(b) the other of the planar seal engagement surface and the planar housing engagement surface being oriented in a plane normal to the longitudinal axis of rotation of the component and defining a depression therein for providing an isolated gap between the planar seal engagement surface and the planar housing engagement surface when the planar seal engagement surface and the planar housing engagement surface are engaged, for receiving the compressible material, and wherein the depression is comprised of a plurality of substantially parallel and concentric circumferential grooves, wherein each of the grooves extends for a length equal to the circumference of the other of the planar seal engagement surface and the planar housing engagement surface; and (c) the seal element being exposed to a fluid pressure on the second side of the seal assembly such that an engagement force is exerted between the planar seal engagement surface and the planar housing engagement surface in order to press the compressible material into the depression and thereby restrain movement of the seal element relative to the seal housing.

6. In a seal assembly for sealing with a rotatable component so that the seal assembly defines a first side of the seal assembly and a second side of the seal assembly and so that the first side is sealed from the second side by the seal assembly, the component defining a longitudinal axis of rotation and the component extending through the seal assembly between the first side and the second side of the seal assembly, the seal assembly comprising a seal element retained within a seal housing, wherein the seal element is comprised of a compressible material, wherein the seal element is comprised of a planar seal engagement surface, and wherein the seal housing is comprised of a planar housing engagement surface for engaging the planar seal engagement surface, the improvement comprising:

(a) the planar seal engagement surface being comprised of the compressible material;

(b) the planar housing engagement surface being oriented in a plane normal to the longitudinal axis of rotation of the component and defining a depression therein for providing an isolated gap between the planar seal engagement surface and the planar housing engagement surface when the planar seal engagement surface and the planar housing engagement surface are engaged, for receiving the compressible material, and wherein the depression is comprised of a plurality of substantially parallel circumferential grooves; and (c) the seal element being exposed to a fluid pressure on the second side of the seal assembly such that an engagement force is exerted between the planar seal engagement surface and the planar housing engagement surface in order to press the compressible material into the depression and thereby restrain movement of the seal element relative to the seal housing.

7. The improvement as claimed in claim 6 wherein the seal element is comprised of a resilient compressible material.

8. The improvement as claimed in claim 6, further comprising a preloading mechanism for urging the planar seal engagement surface and the planar housing engagement surface into engagement with each other.

9. The improvement as claimed in claim 8 wherein the preloading mechanism is comprised of at least one spring which is retained by the seal housing.

10. In a seal assembly for sealing with a rotatable component so that the seal assembly defines a first side of the seal assembly and a second side of the seal assembly and so that the first side is sealed from the second side by the seal assembly, the component defining a longitudinal axis of rotation and the component extending through the seal assembly between the first side and the second side of the seal assembly, the seal assembly comprising a seal element retained within a seal housing, wherein the seal element is comprised of a compressible material, wherein the seal element is comprised of a planar seal engagement surface, and wherein the seal housing is comprised of a planar housing engagement surface for engaging the planar seal engagement surface, the improvement comprising:
  (a) the planar seal engagement surface being comprised of the compressible material;
  (b) the planar housing engagement surface being oriented in a plane normal to the longitudinal axis of rotation of the component and defining a depression therein for providing an isolated gap between the planar seal engagement surface and the planar housing engagement surface when the planar seal engagement surface and the planar housing engagement surface are engaged, for receiving the compressible material, and wherein the depression is comprised of a plurality of substantially parallel and concentric circumferential grooves; and
  (c) the seal element being exposed to a fluid pressure on the second side of the seal assembly such that an engagement force is exerted between the planar seal engagement surface and the planar housing engagement surface in order to press the compressible material into the depression and thereby restrain movement of the seal element relative to the seal housing.

11. In a seal assembly for sealing with a rotatable component so that the seal assembly defines a first side of the seal assembly and a second side of the seal assembly and so that the first side is sealed from the second side by the seal assembly, the component defining a longitudinal axis of rotation and the component extending through the seal assembly between the first side and the second side of the seal assembly, the seal assembly comprising a seal element retained within a seal housing, wherein the seal element is comprised of a compressible material, wherein the seal element is comprised of a planar seal engagement surface, and wherein the seal housing is comprised of a planar housing engagement surface for engaging the planar seal engagement surface, the improvement comprising:
  (a) the planar seal engagement surface being comprised of the compressible material;
  (b) the planar housing engagement surface being oriented in a plane normal to the longitudinal axis of rotation of the component and defining a depression therein for providing an isolated gap between the planar seal engagement surface and the planar housing engagement surface when the planar seal engagement surface and the planar housing engagement surface are engaged, for receiving the compressible material, and wherein the depression is comprised of a plurality of substantially parallel and concentric circumferential grooves, wherein each of the grooves extends for a length equal to the circumference of the planar housing engagement surface; and
  (c) the seal element being exposed to a fluid pressure on the second side of the seal assembly such that an engagement force is exerted between the planar seal engagement surface and the planar housing engagement surface in order to press the compressible material into the depression and thereby restrain movement of the seal element relative to the seal housing.

12. In a seal assembly for sealing with a rotatable component so that the seal assembly defines a first side of the seal assembly and a second side of the seal assembly and so that the first side is sealed from the second side by the seal assembly, the component defining a longitudinal axis of rotation and the component extending through the seal assembly between the first side and the second side of the seal assembly, the seal assembly comprising a seal element retained within a seal housing, wherein one of the seal element and the seal housing is comprised of a compressible material, wherein the seal element is comprised of a planar seal engagement surface, and wherein the seal housing is comprised of a planar housing engagement surface for engaging the planar seal engagement surface, the improvement comprising:
  (a) one of the planar seal engagement surface and the planar housing engagement surface being comprised of the compressible material; and
  (b) the other of the planar seal engagement surface and the planar housing engagement surface being oriented in a plane normal to the longitudinal axis of rotation of the component and defining a depression therein for providing an isolated gap between the planar seal engagement surface and the planar housing engagement surface when the planar seal engagement surface and the planar housing engagement surface are engaged, for receiving the compressible material; and
  (c) the seal element being exposed to a fluid pressure on the second side of the seal assembly such that an engagement force is exerted between the planar seal engagement surface and the planar housing engagement surface in order to press the compressible material into the depression and thereby restrain movement of the seal element relative to the seal housing, wherein the fluid pressure on the second side of the seal assembly is provided by a lubricating fluid.

13. The improvement as claimed in claim 12 wherein the seal assembly is incorporated into a drilling apparatus so that the seal assembly isolates the lubricating fluid on the second side of the seal assembly from a drilling fluid on the first side of the seal assembly.

14. The improvement as claimed in claim 13 wherein the drilling apparatus provides for pressure balancing so that a borehole pressure on the first side of the seal assembly is transmitted to the second side of the seal assembly and so that the fluid pressure is comprised of the borehole pressure.

* * * * *

UNITED STATES PATENT AND TRADEMARK OFFICE
CERTIFICATE OF CORRECTION

PATENT NO. : 7,651,100 B2
APPLICATION NO. : 10/769761
DATED : January 26, 2010
INVENTOR(S) : Edward James Cargill It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 849 days.

Signed and Sealed this

Twenty-eighth Day of December, 2010

David J. Kappos
*Director of the United States Patent and Trademark Office*